United States Patent
Stasi

(10) Patent No.: US 7,301,438 B2
(45) Date of Patent: Nov. 27, 2007

(54) ANCILLARY PROTECTION SYSTEM AGAINST THE UNAUTHORIZED USE OF AN ACCESS AND/OR IGNITION KEY

(75) Inventor: Paolo Stasi, Cantello (IT)

(73) Assignee: Vega Elettronica S.R.L (IT)

( * ) Notice: Subject to any disclaimer, the term of this patent is extended or adjusted under 35 U.S.C. 154(b) by 339 days.

(21) Appl. No.: 10/490,420

(22) PCT Filed: Nov. 8, 2001

(86) PCT No.: PCT/IT01/00562

§ 371 (c)(1),
(2), (4) Date: Aug. 30, 2004

(87) PCT Pub. No.: WO03/042930

PCT Pub. Date: May 22, 2003

(65) Prior Publication Data

US 2005/0007235 A1     Jan. 13, 2005

(51) Int. Cl.
*H04Q 1/00* (2006.01)
*G05B 19/00* (2006.01)

(52) U.S. Cl. ............... 340/5.72; 340/5.61; 340/5.64; 307/10.5

(58) Field of Classification Search .......... 340/825.72, 340/825.69, 10.1, 5.61–5.64, 5.72, 5.31, 340/426.11, 426.36, 426.13, 426.16; 307/10.5
See application file for complete search history.

(56) References Cited

U.S. PATENT DOCUMENTS 3,555,758 A * 1/1971 Lack .................... 52/309.9
4,595,902 A * 6/1986 Proske et al. ............... 340/5.64
5,053,774 A * 10/1991 Schuermann et al. .... 340/10.34
5,084,699 A * 1/1992 DeMichele ............... 340/10.34
5,250,944 A * 10/1993 Urbas et al. ........... 340/870.31
5,552,789 A * 9/1996 Schuermann .............. 340/5.21
5,818,330 A * 10/1998 Schweiger ............. 340/426.13
5,905,444 A * 5/1999 Zimmer ..................... 340/5.61
5,955,969 A * 9/1999 D'Hont ....................... 340/928
6,429,768 B1* 8/2002 Flick .......................... 340/5.2
6,781,507 B1* 8/2004 Birchfield et al. ......... 340/5.61

FOREIGN PATENT DOCUMENTS

| EP | 0 689 974 A1 | 1/1996 |
| EP | 0 886 024 A2 | 12/1998 |
| EP | 0 886 024 A3 | 12/1998 |
| GB | 2 296 804 A | 7/1996 |
| WO | WO 99/36295 A2 | 7/1999 |
| WO | WO 99/36295 A3 | 7/1999 |

* cited by examiner

*Primary Examiner*—Edwin C. Holloway, III
(74) *Attorney, Agent, or Firm*—Connolly Bove Lodge & Hutz LLP

(57) ABSTRACT

A protection system against the unauthorized use of an access key with electronic identification that, when is active, prevents the recognition of the original access key. This is done by disturbing the transfer of the code by magnetic induction from the circuit incorporated in the key to the device of contactless powering and recognition of the identification code installed in the lock. A code information corrupting disturbance in produced by a device of directionally emitting electromagnetic energy toward the point of space of magnetic coupling between a primary winding of an air transformer of the recognition device of the lock and the secondary winding of the air transformer coupled to an integrated circuit contained in the key. The emitting device acts from a distance that may be even larger than one meter from the so equipped lock.

19 Claims, 8 Drawing Sheets ic identification key is inserted. According to this aspect, the device of the invention is installed in the car.

ANCILLARY PROTECTION SYSTEM AGAINST THE UNAUTHORIZED USE OF AN ACCESS AND/OR IGNITION KEY

FIELD OF THE INVENTION

The present invention relates in general to anti-theft devices a more precisely to an auxiliary protection system against the unauthorized use of an encoded access and/or ignition key with electronic identification.

BACKGROUND OF THE INVENTION

The use of anti-theft devices employing an access key with electronic identification is becoming more and more diffused. Nowadays such a device is present as standard equipment in practically all new cars. Commonly these access keys with electronic identification contain in the handle portion thereof a contactless powering device gathering electromagnetic energy from the electronic circuitry installed in the lock into which the key is inserted and communicating its identification code to the circuitry of remote contactless powering and recognition of the code installed in the lock. If the powering and code recognition device installed in the lock fails to detect the valid code, it blocks the lock and in case of car does not enable the starting of the engine.

These devices are particularly effective because the mere duplication of the key is useless if its identification code is unknown.

The access key may even be in the form of a programmed smart-card or a common key containing in its handle portion a transmitter.

According to a common technique, the electronic circuits contained in coded key are remotely powered without establishing any electric contact with an electric source such as a battery by exploiting magnetic induction. In practice, the remote powering and code recognition system installed in the lock upon inserting the key, generates an electromagnetic field forcing an AC current of a relatively high frequency, usually in the order of kHz, in a (primary) winding.

The circuit encased in the key comprises a (secondary) winding coupled to dedicated power supply pins of an integrated circuit (microchip). When the key is introduced in the lock, the (secondary) winding contained in it is immersed in the electromagnetic field generated by the (primary) winding of the lock system for contactlessly powering the circuits contained in the key and for eventually detecting and recognizing its code.

Substantially, the windings behave as the primary and secondary windings of a transformer in air. On the (secondary) winding present in the key an electromotive force, which is commonly rectified and regulated, for supplying the functional circuits contained in the integrated circuit. The so powered functional circuits produce a certain coded identification signal.

A very effective way of producing a detectable signal corresponding to the identification code of the key is to make the functional circuits of the integrated circuit contained in the key, that constitute an electric load of the secondary winding of the air-core transformer, absorb energy in a discontinuous or variable manner according to a certain temporal pattern. In this way a certain time-based pattern of variation of the amplitude of the voltage in the primary winding of the contactless powering device of recognition and validation of the identification code of the key is induced.

A comparator of the circuitry of recognition of the device detects the time-base pattern of current absorption variations, generating a corresponding logic signal in the form of a sequence of bits of the key identification code, that is inviolably stored in a nonvolatile manner in the integrated circuit contained in the key.

A diagram of a common car anti-theft device using the described system is depicted in FIG. 1.

When the key is inserted in the lock 5, a certain voltage is induced on the secondary winding 3, which may even be integrated on the microchip, contained in the handle of the key 4 together with an integrated circuit nonvolatily storing a certain digital identification code. Therefore, the microchip, depicted as a gray shaded rectangle, is powered with this voltage.

Once the functional integrated circuits contained in the microchip are so powered, the secondary circuit of the air transformer will alternate phases in which it absorbs a certain current to phases in which the current absorption becomes almost negligible.

Therefore, a variable current (in practice a discontinuous current) will circulate in the secondary winding 3 of the air transformer of the contactless powering system and thus, because of mutual induction, a back electromotive force will induced on the primary winding 2 of the device PR installed in the lock 5.

This back electromotive force reduces the amplitude of the alternated current present on the nodes of the primary winding, as shown in FIG. 2a.

A common comparator contained in the device PR installed in the lock 5, detects these amplitude variations of the alternated voltage on the primary winding 2 generating an active logic signal when the amplitude is smaller than a pre-established threshold.

This logic signal, shown in FIG. 2b, is sampled at a pre-established clock frequency for providing the bit sequence of the identification code of the key in the lock. If the microprocessor contained in the device PR installed in the lock 5 does not recognize (validate) the code, it inhibits ignition of the motor 1.

The whole process of contactless powering and recognition of the code takes a relatively short time, typically about 100 ms.

Unfortunately such a system is completely useless in case of thieving of the key or robbery because the lawful owner cannot prevent the use of the stolen key by a thief.

OBJECT AND SUMMARY OF THE INVENTION

It has been found and is the object of the present invention an ancillary protection system against the unauthorized use of an electronic identification access key that, when activated, prevents the recognition of the original access key. Therefore, even if the original key has been stolen, it can be made useless by activating if not done preventively (for instance by means of a radio transmitted command) the protection system of the invention.

The system of the invention, which can be activated by the lawful owner, prevents the recognition of the original access key by interfering with the transfer of the code by mutual induction from the circuit incorporated in the key to the device of contactless powering and recognition of the code installed in the lock 5.

According to the main aspect of the invention, the interference is produced by a device positionable at a distance that may be even greater than a meter from the interacting parts, that is the lock 5 or slot in which the electronically coded key must be introduced. This feature is important to make the ancillary antitheft system of difficult detection and neutralization by a thief In fact any attempt of inspecting the lock 5 and the parts adjacent to it to gather a clue on why the original key does not work not produce results.

Essentially, the ancillary or secondary protection system of the invention employs a device that directionally emits electromagnetic energy toward the lock 5 or slot into which the key must be inserted, that is toward the point is space of the air gap between the primary winding of the contactless powering and code recognition device installed in the lock 5 and the secondary winding of the integrated circuit contained in the key.

When the protection system of the invention is on the emitting device is automatically activated upon insertion of the key in the lock 5. The injection of electromagnetic energy, preferably at the same working frequency of the windings of the air transformer, induces on the primary winding an interfering voltage of magnitude of the same order and generally of opposite sign of the variations due to the back electromotive force induced during phases of relatively high current absorption by the integrated circuit of the key.

The protection system of the invention may be turned on/off in any known manner; for instance, by typing a code on a keyboard, by closing/opening a hidden switch or even by transmitting a radio command to a multifunctional alarm system that may be installed on the vehicle.

The invention is more precisely defined in the annexed claims.

BRIEF DESCRIPTION OF THE DRAWINGS

The different aspects and advantages of the invention will appear even more evident through the following description of an embodiment and by referring to the attached drawings, wherein:

FIGS. 4a and 4b are diagrams of the main signals of the system of FIG. 3 when the device of directional injection is off;

FIGS. 4c and 4d are diagrams of the main signals of the system of FIG. 3 when the device of directional injection is on;

FIGS. from 7 to 12 depict wave shapes detected during a test of a device of the invention.

DESCRIPTION OF AN EMBODIMENT OF THE INVENTION

Figure 3:
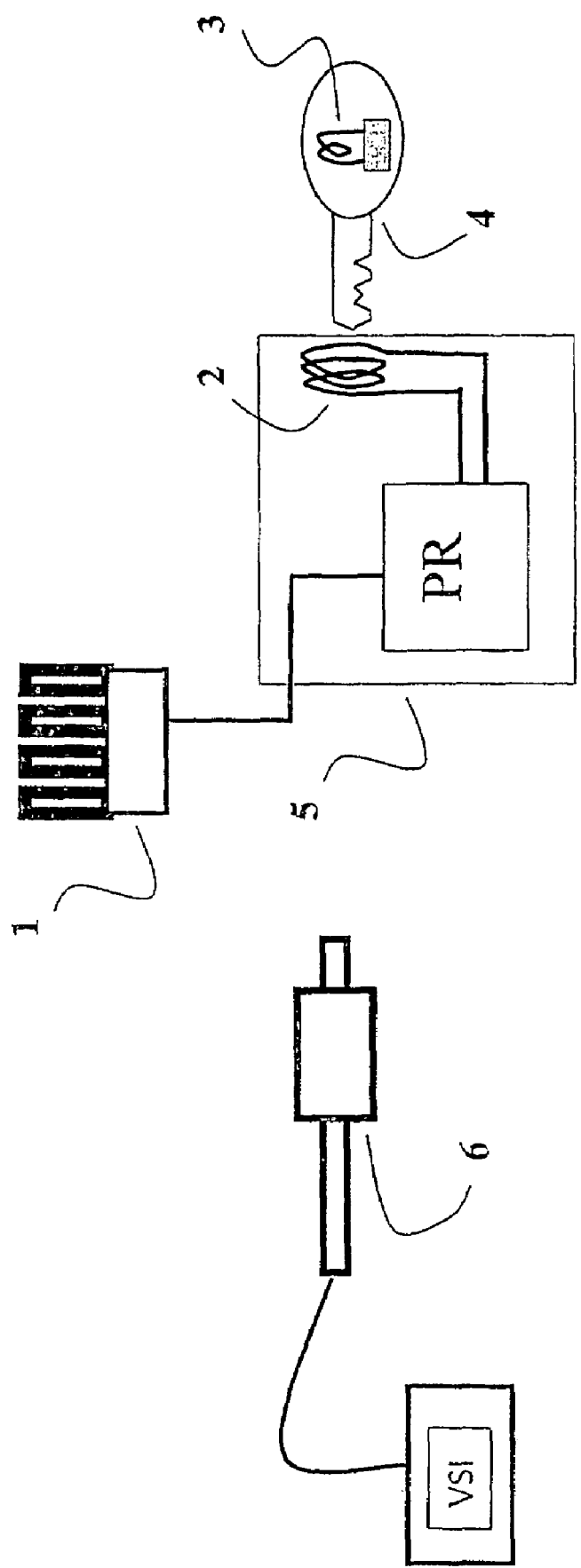
FIG. 3 depicts the ancillary protection system of the invention employing a directional injector of electromagnetic energy.

A basic diagram of the system of the invention installed in a vehicle is depicted in FIG. 3. The ancillary protection system of the invention was a device of directional emission of electromagnetic energy constituted by a directional emitter or antenna 6 driven by the circuit block VSI.

The device of directional emission of energy, enabled by the authorized user for instance by typing a code on a keyboard or by a remote control, when the key 4 is inserted in the lock 5 emits a radio signal through the directional emitter 6. By injecting electromagnetic energy in the form of a radio signal in the air space of the air transformer of the code recognition device of the lock, on the primary winding, acting that acts as a receiving antenna, an interfering or disturbing voltage is induced that practically prevent recognition of the identification code of the key by the device.

In order to better explain the functioning of the system of the invention, let us refer to FIGS. 4a to 4d.

Figure 1:
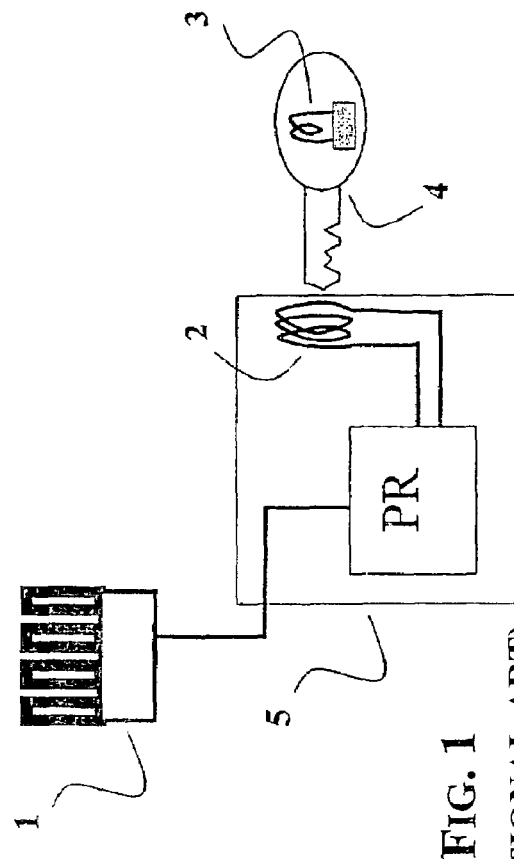
FIG. 1 illustrate the way an access key incorporating a contactless powered integrated circuit chip storing a readable identification code.
Figure 2:
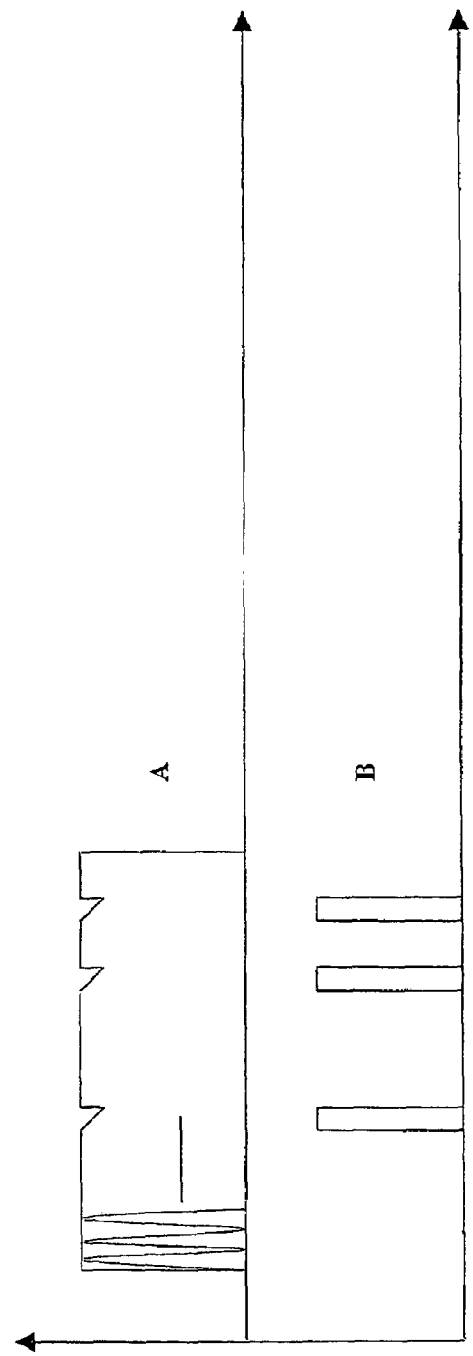
FIGS. 2a and 2b are diagrams of the main signals of FIG. 1.
Figure 4:
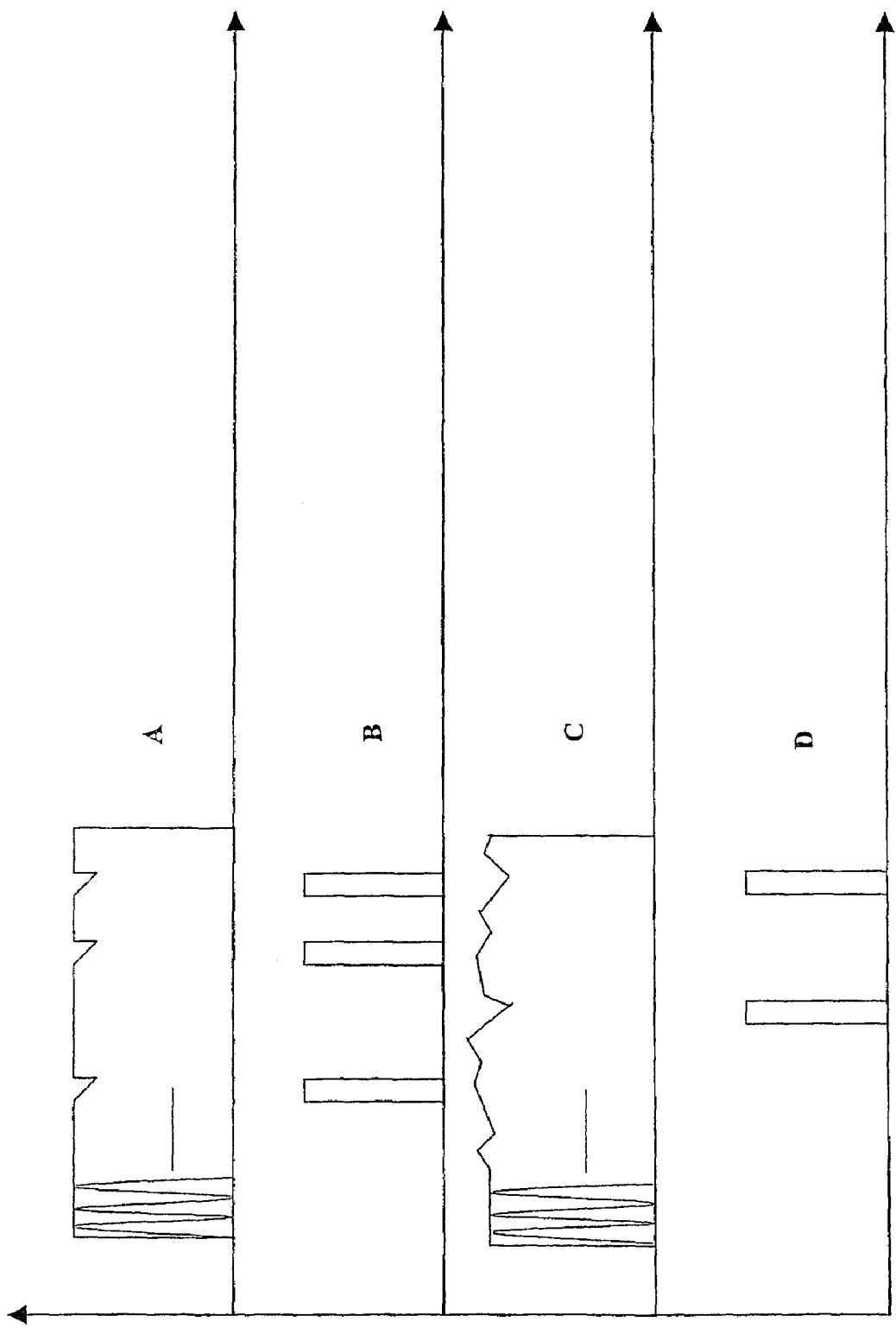
Figure 5:
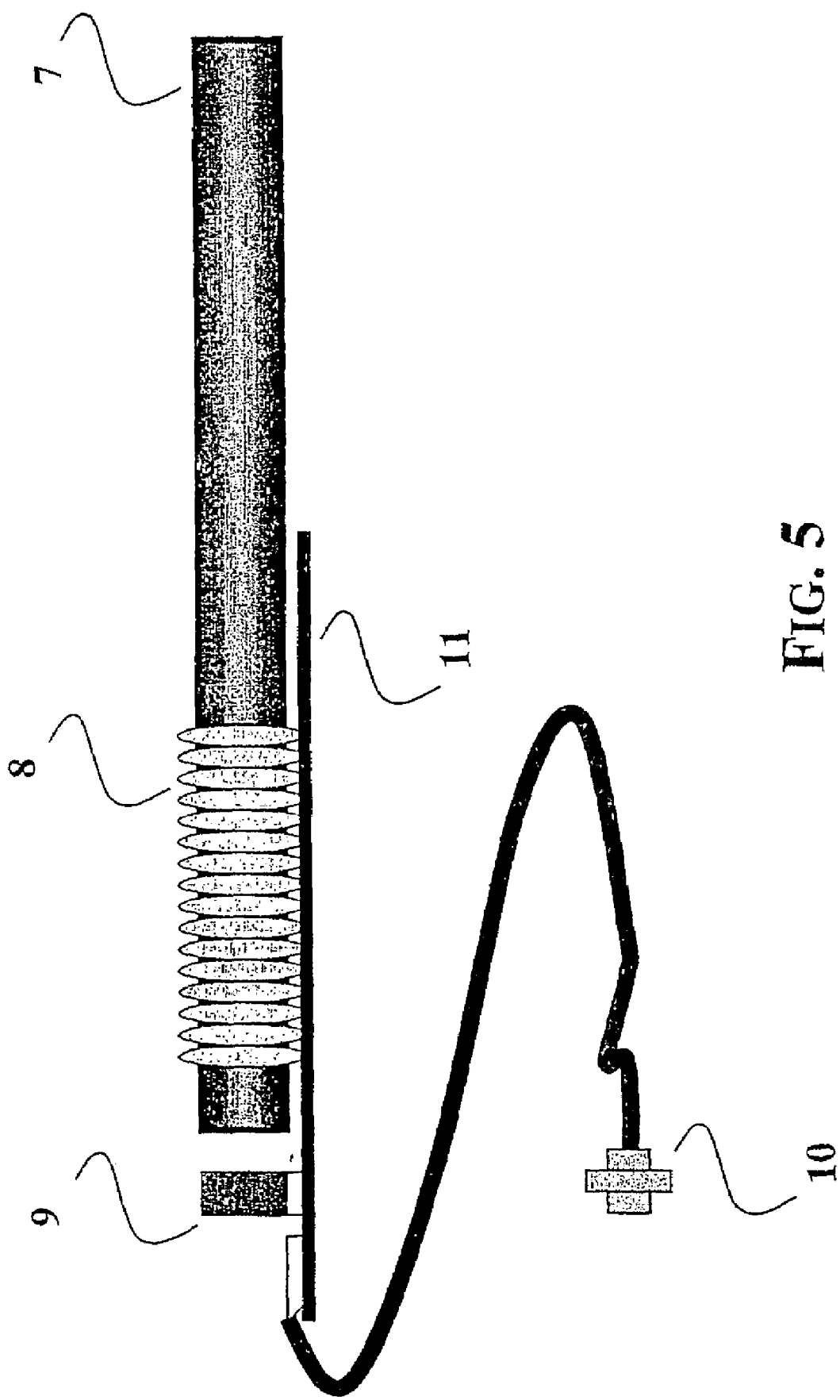
FIG. 5 depicts a preferred embodiment of the directional injection device or antenna of the system of the invention.
Figure 6:
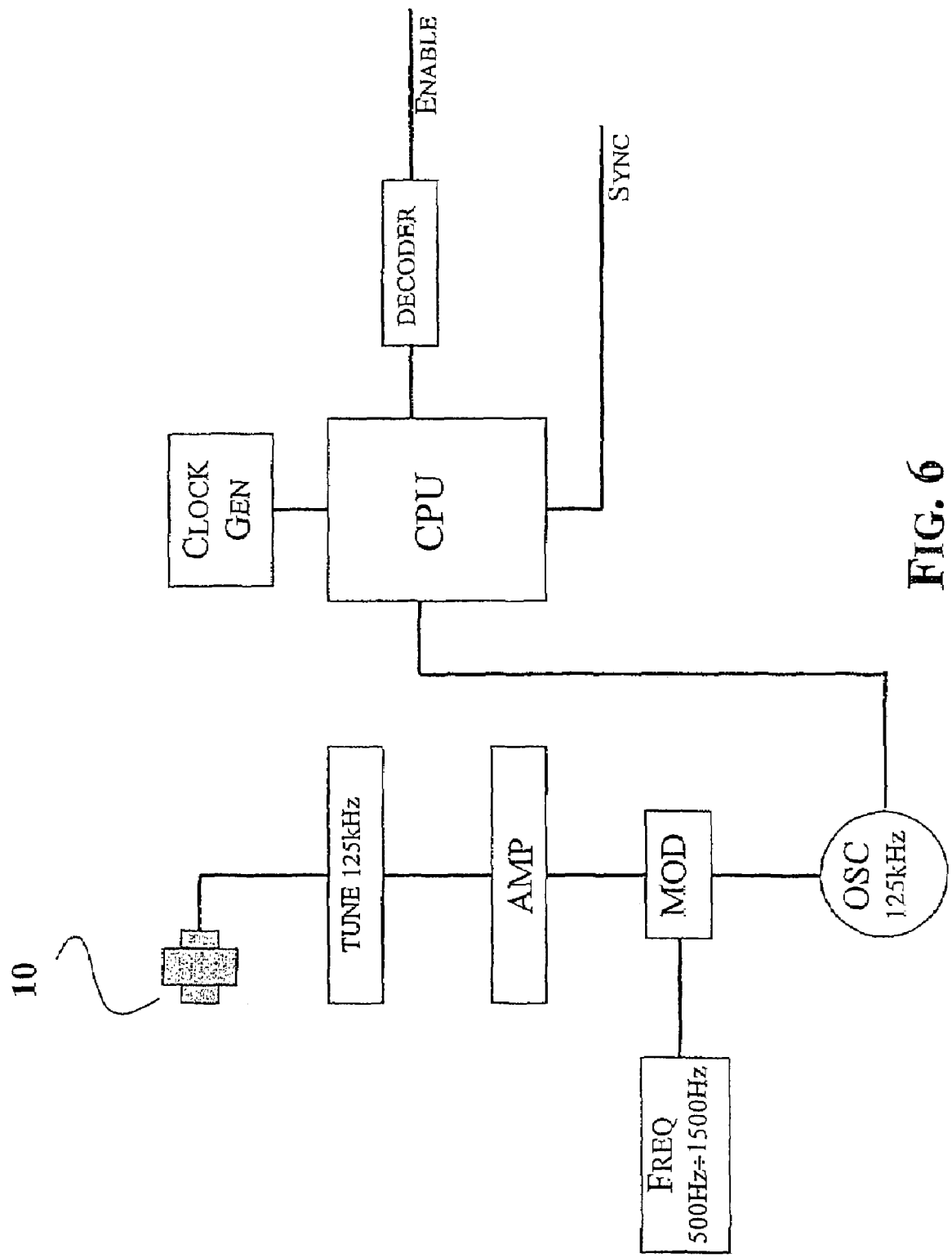
FIG. 6 is a block diagram of the driving circuit of the device of directional injection of the system of the invention.

FIGS. 4a and 4b are idealized diagrams, identical to the diagrams of FIG. 2, of the voltage on the primary winding 2 and of the digital signal that is eventually extracted from it when the interfering injection device of the ancillary protection system of this invention is off.

FIGS. 4c and 4d are diagrams corresponding to those of FIGS. 4a and 4b when the device of injection of electromagnetic energy of the invention is on.

As it may be easily noticed, the disturbing voltage, induced because of the injection of electromagnetic energy by the device of the invention on the primary winding 2, modifies (FIG. 4c) the pattern of voltage variations making the digital signal that is eventually extracted (FIG. 4d) from it different from the identification code of the key (FIG. 4b).

The interference becomes more effective as the carrier frequency of the emitted electromagnetic signal, generated by the directional emitter 6, closer to the working frequency of the air-core transformer, and as the frequency at which this carrier frequency is amplitude modulated is closer to the rate of detection and reading of the bits of the code of the key.

A problem faced and solved by the inventor consist in that the devices of contactless powering and recognition of the key code work at a relatively low frequency, typically of 125 kHz; corresponding to a wavelength of more than 2 km. This wave length is such to discourage the realization of antennas to be installed inside a vehicle because of the excessively large dimensions that would normally be required.

It has been found that by employing a radio wave emitter, substantially in the form of a resonant LC circuit tuned at the working frequency of the primary winding 2 and constituted by a capacitor 9 and a coil 8 wound on a ferromagnetic core 7, it is possible to obtain a good directionality and effectiveness with an extraordinarily compact device, only few centimeters long, generally of about 8-15 cm and having a diameter or maximum width of about 1 or 2 cm. The directional antenna or emitter so realized may be easily hidden in a cavity or disguised in a receptacle that may be created in the padding of the ceiling or of the seats or in the structures of the rear visor or in any other suitable position even at a considerable distance from the lock 5 up to one or more meters.

The directional emitting antenna 6 may be fabricated on a supporting board 11, for example a glass-fiber reinforced plastic printed circuit board, and may be connected to the output of driving circuit VSI through a shielded cable and suitable connector 10.

In the considered example, the coil 8 is constituted by a double winding of Litzendraht Wire ("Litz wire") around a ferrite core 7 having a diameter of 10 mm and a length of 125 mm, and a capacitor 9 of about 2200-3300 pF. With these parameters and values, an effective directional antenna small enough to be easily hidden in a car interior capable of inducing a disturbing voltage on the primary winding of the air transformer of the code recognition system even from a distance of about 1 meter.

The driving circuit VSI generally comprises a microprocessor unit CPU, a clock signal generator CLOCK GEN of which is turned on by a command ENABLE provided by the authorized user.

The command ENABLE may be produced by typing a certain code on a keyboard on the console of the vehicle or transmitting a certain signal with a hand held remote control or via radio through a remote station. In the latter case the generated signal ENABLE may be encrypted and may be locally decoded by a decoder DECODER. Obviously, such a signal for enabling the system of the invention may also and preferably disable the supplying of all the functional circuits of the block VSI, when the system is turned off.

If the system of the invention is active, when the key is inserted in the lock 5, the microprocessor unit CPU receives a synchronization signal SYNC and turns on the oscillator OSC, that oscillates substantially at the working frequency of the primary winding 2. A modulating stage MOD produces a modulated signal using the frequency of the oscillator as carrier frequency and a second frequency, produced by the generator FREQ, as modulating frequency.

This modulation frequency preferably is equal or a multiple of the frequency at which the bits of the code of the access key are read by the lock system.

For example, the modulating frequency may be comprised between 500 Hz and 1500 Hz and even more preferably it is not fixed but is slowly variable, between a lower bound and an upper bound, in a random manner or in al alternating sweeping fashion.

The amplitude modulated signal output by the modulator MOD may be commonly amplified by an amplifier AMP and, through a tuned coupling stage TUNE, is fed to the resonant LC circuit of the directional antenna of the invention.

When the carrier and modulating frequencies are chosen with the above mentioned criteria, a relatively small power of about 200 mW is sufficient to effectively disturb the recognition of the identification code of the key.

EXAMPLE

The effectiveness of the system of the invention has been demonstrated by an experiment carried out on a commercially available car, more precisely a Crysler Vojager TD 2.5 LE. The signals present on the significative output nodes of the device of recognition of the code of the key introduced in the ignition lock installed on the steering column of the car and the drive signals of the directional antenna of the ancillary protection system of this invention have been strumentally monitored.

The results of the test are reported by way of waveforms in the FIGS. from 7 to 12.

Figure 7:
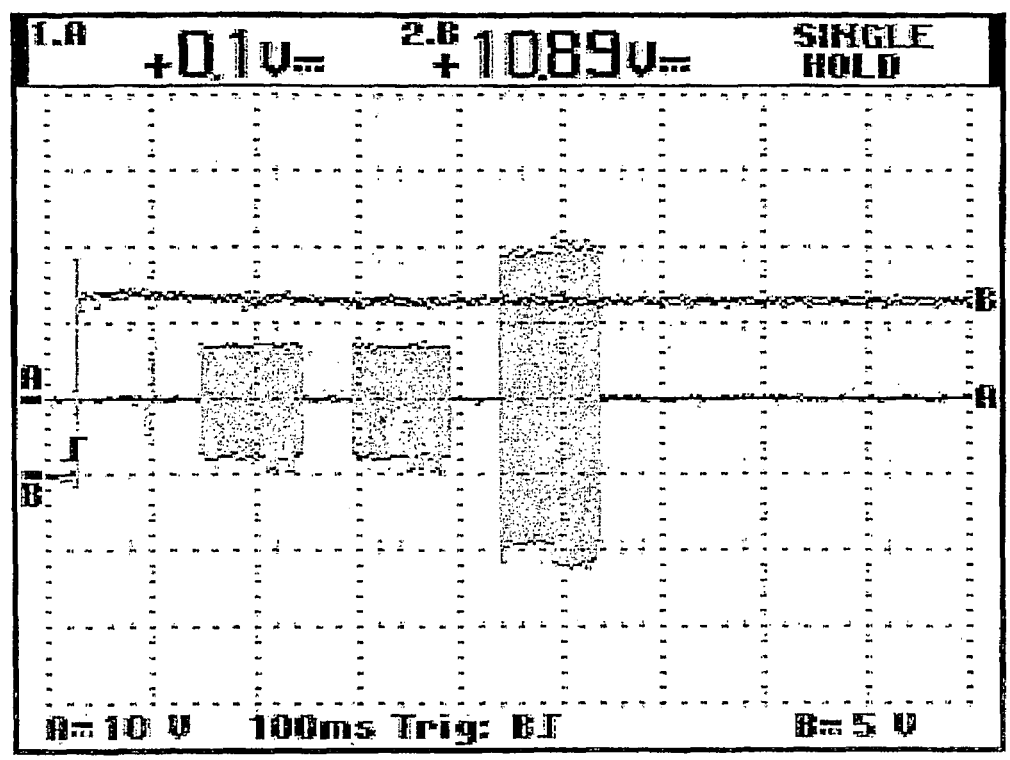

FIG. 7 shows the signal on the primary winding of the contactless powering system of detection of the code of the key present inside the ignition lock of the car being tested, after having connected the positive pole of the battery (+15V) to the supply circuits of the console of the car by inserting and turning the key to a first stop position.

Figure 8:
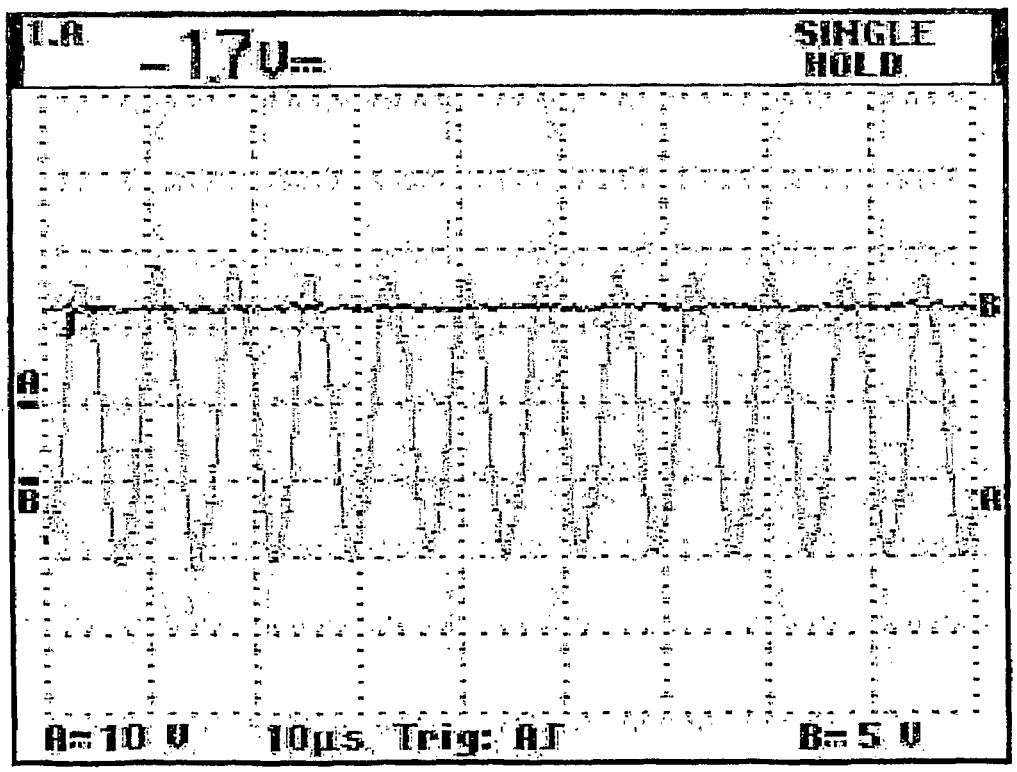

FIG. 8 depicts the sinusoidal signal at 125 kHz that is fed to the primary winding for remotely and contactlessly powering the circuits contained in the microchip of the key.

Figure 9:
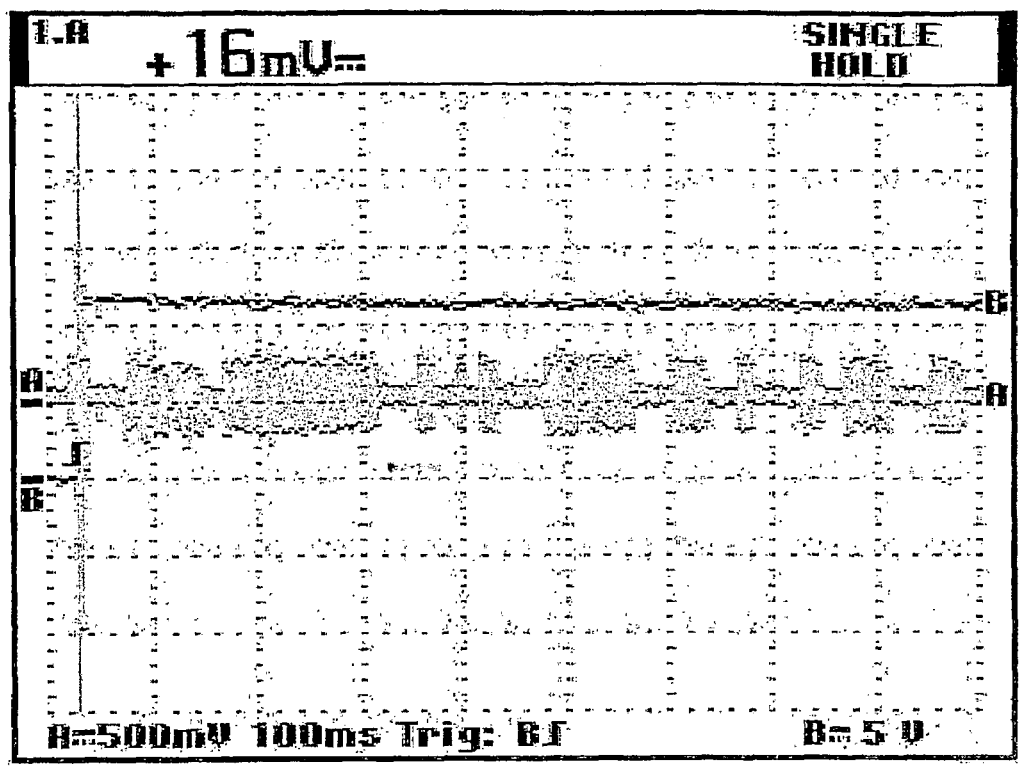

FIG. 9 depicts the received, processed and decoded signal that the device for receiving, processing and decoding the identification coded signal of the key, installed inside or about the mechanical part of the lock, sends to the electronic circuitry of the vehicle.

Figure 10:
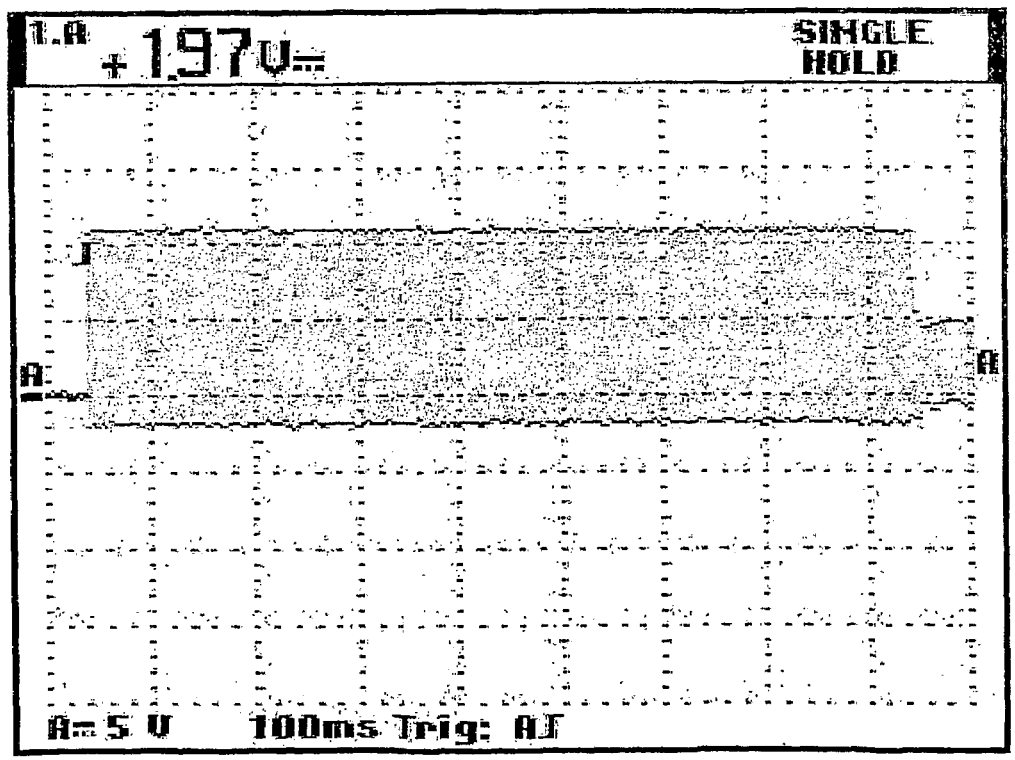

FIG. 10 shows the carrier signal at 125 kHz, having the same frequency of the sinusoidal signal being fed to the primary winding of the device of the lock for contactlessly powering the circuits of the key and for sensing the identification code of the key, generated by the oscillator included in the VSI block of the system of this invention, before being modulated.

Figure 11:
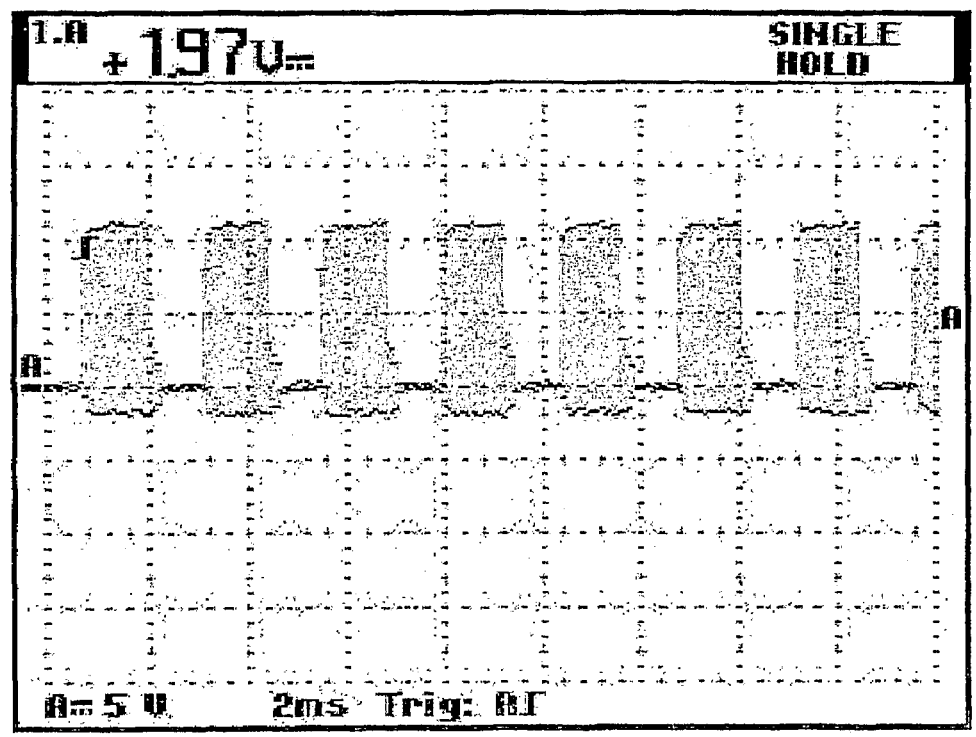

FIG. 11 shows the driving signal of the directional antenna for injecting interfering electromagnetic energy, modulated at a frequency comprised between 500 Hz and 1500 Hz, at the output of the modulating stage of the VSI block.

Figure 12:
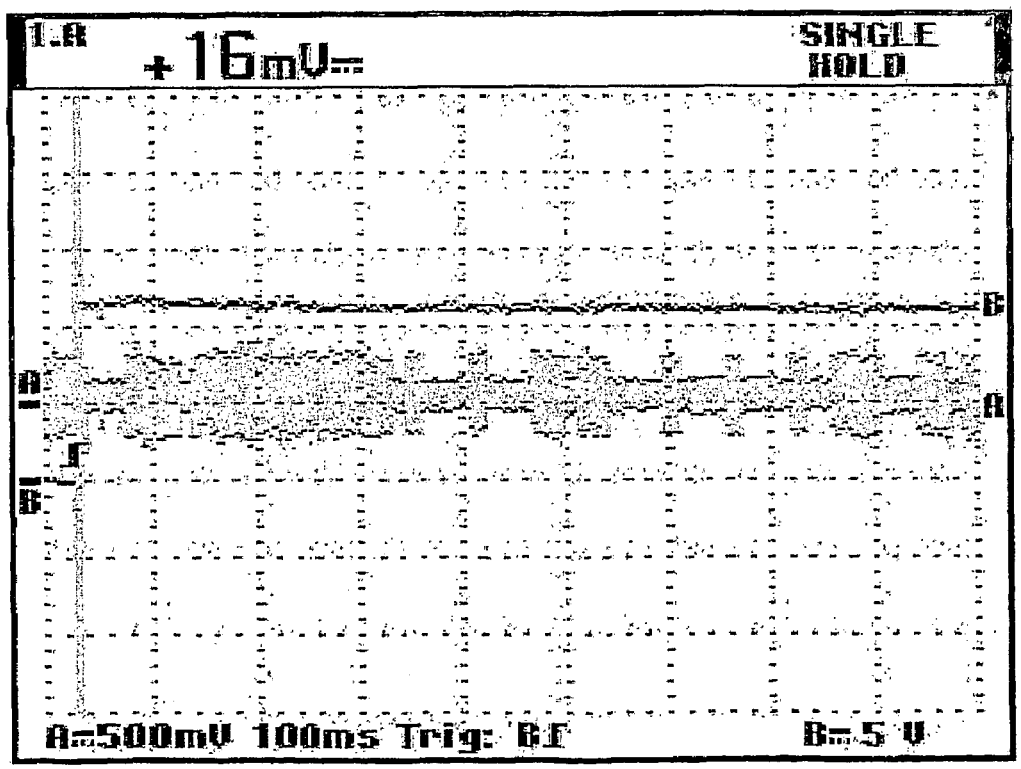

FIG. 12 shows the signal gathered, processed and decoded that the key code recognition system of the lock sends to the control circuitry of the vehicle when the recognition disturbing system of the invention is active, and that the control circuitry of the vehicle does not recognize as valid, thus preventing start up of the motor.

It is visually noticeable how the identification code of the key that is sensed by the system is decisively corrupted such to be unrecognizable by the system on the vehicle.

The invention claimed is:

1. A method of ancillary protection against unauthorized use of an unpowered uniquely coded access and/or ignition key embedding an electronic identification periodic bit coding means connected to a secondary coil to be inserted in a receptacle or lock having electrically powered bit code sensing electronic means connected to a primary coil driven at a certain frequency, for transferring electric power to the said secondary coil in the access and/or ignition key, the method comprising the steps of:

procuring and installing a device of directional emission of electromagnetic energy, positioning the antenna or directional emitter of the device at a certain distance from the position of said receptacle or lock, hiding or disguising its presence;

irradiating toward said primary and secondary coils, respectively associated to said receptacle and to the key inserted therein an electromagnetic signal of the same working frequency of said coupled primary and secondary coils, amplitude modulated at a frequency randomly varying between a lower bound equal to the bit rate of the periodic bit coding and an upper bound equal to a multiple of the bit rate, equal or greater than the rate of said periodic bit coding and detectable by said sensing electronic means to corrupt the information content of said sensed code.

2. The method of claim 1, wherein irradiation toward said primary and secondary coils staffs upon inserting said injection key into said receptacle or lock.

3. An ancillary protection system against unauthorized use of an unpowered uniquely coded access and/or ignition key embedding an electronic identification periodic bit coding means connected to a secondary coil, to be inserted in a receptacle or lock having electrically powered bit code sensing electronic means connected to a primary coil constituting an ak-core transformer with said secondary coil, driven at a certain frequency for contactlessly transferring electric power to the said secondary coil in the access and/or ignition key and comprising a recognition device of the code of said key in the form of a sequence of bits, said periodic bit coding means in said key being an integrated circuit supplied at a rectified and regulated voltage produced by magnetic induction in said secondary coil and adapted to alternate phases of current absorption to phases of substantially null current absorption on a time base corresponding to said periodic bit sequence of code identification and inducing on said primary coil a corresponding back electromotive force, a comparator in said code recognition device of the voltage amplitude present on said primary winding generating a signal representing said bit sequence, and at least a microprocessor unit receiving as input said signal and validating the key if the detected bit sequence corresponds to the unique identification code of said key, the ancillary protection system comprising:
- a device of directional emission of electromagnetic energy disguisingly installed in a remote position from the lock, irradiating toward said air transformer an electromagnetic signal of the same frequency of the frequency of functioning of said air core transformer and amplitude modulated at a frequency randomly varying between a lower bound equal to the bit rate of the periodic bit coding and an upper bound equal to a multiple of the bit rate;
- means for determining an automatic activation of said disguisingly and remotely installed device when enabled by a user's command upon insertion of the key in said receptacle or lock, such to induce on said primary winding a code recognition preventing disturbance voltage.

4. The ancillary protection system according to claim 3, wherein said device of directional emission of electromagnetic energy comprises a directional antenna or emitter composed of a LC resonant circuit tuned on said working frequency of the air transformer, constituted by a capacitor and by a coil wound on a ferromagnetic core functioning as directional emitter driven by a generating circuit for said modulated signal.

5. The ancillary protection system of claim 4, characterized in that said generating circuit comprises:
- a second microprocessor unit enabled by a user's command for receiving a synchronization signal when the key is inserted in said receptacle or lock;
- a generator of a signal of frequency equal to the working frequency of the primary winding;
- a generator of a modulation frequency;
- an amplitude modulator of said signal at said working frequency with said modulation frequency; and
- an amplifier coupled to the output of said modulator and a tuned stage coupling the modulated and amplified signal to said directional emitter, means for activating the system by command of the user.

6. The ancillary protection system according to claim 5 wherein said command is issued by the user via radio by a remote control or by typing a code on a keyboard.

7. A car anti-theft device comprising an ancillary protection system according to claim 5, wherein said first microprocessor unit enables the ignition of the engine if the read bit sequence corresponds to the identification code of said key.

8. The ancillary protection system according to claim 3 wherein said coil comprises a double winding of Litz wire on a core of ferrite.

9. A method of protecting against an unauthorized use of a passively powered and uniquely coded key having a periodic bit coding and a secondary coil associated therewith for use in conjunction with a receptacle or lock having a primary coil driven at a certain frequency, the method comprising:

providing an emission of electromagnetic energy at the certain frequency; and directing the emission of electromagnetic energy to the secondary coil and the primary coil so as to interfere with sensing of an electrically powered bit code by the receptacle or lock, where said step of providing an emission comprises amplitude modulating the electromagnetic energy at a frequency randomly varying between a lower bound equal to the bit rate of the periodic bit coding and an upper bound equal to a multiple of the bit rate and equal to or greater than a bit rate of said periodic bit coding, and wherein said amplitude modulating corrupts an information content of said sensed electrically powered bit code.

10. The method of claim 9, wherein said step of directing the emission of electromagnetic energy comprises positioning an antenna or directional emitter at a certain distance from a position of said receptacle or lock, the method further comprising hiding or disguising the antenna or directional emitter.

11. An ancillary protection system, the system comprising:
- a receptacle or lock comprising an electrically powered code recognition device configured to sense a bit code;
- a primary coil operatively connected to the code recognition device;
- a passively powered and uniquely coded key, said key comprising means for embedding an electronic identification periodic bit coding in the key;
- a secondary coil arranged in the key and operatively coupled to the means for embedding, wherein the primary coil and the secondary coil form a transformer operating at a working frequency, and wherein the means for embedding receives electrical power from the primary coil through the secondary coil,
- wherein the code recognition device senses the embedded electronic identification periodic bit coding in the key in the form of a sequence of bits of a certain bit rate; and
- a directional electromagnetic energy emitting device hiddenly remotized from the receptacle or lock,
- a circuit generating and feeding a signal to said directional electromagnetic energy emitting device of the same working frequency of the transformer and amplitude modulated at a frequency randomly varying between a lower bound equal to the bit rate of the periodic bit coding and an upper bound equal to a multiple of the bit rate, and
- wherein said emitting device selectively emits an electromagnetic signal onto the receptacle or lock of the same working frequency so as to induce a code recognition disturbance voltage on said primary winding that prevents the code recognition device from correctly sensing the sequence of bits.

12. The system of claim 11, wherein said means for embedding in said key comprises an integrated circuit supplied by a voltage produced by magnetic induction in said secondary coil.

13. The system of claim 12, wherein said voltage produced by magnetic induction comprises a voltage produced by alternating phases of current absorption and phases of substantially null current absorption on a time base corresponding to said periodic bit sequence, whereby said voltage produced by magnetic induction is induced on said primary coil as a corresponding back electromotive force.

14. The system of claim 11, wherein the directional electromagnetic energy emitting device is disguised in a remote position from the lock so as to not be readily identified as a part of the system.

15. The system of claim 11, wherein said directional electromagnetic energy emitting device comprises a directional emitter comprising an LC resonant circuit tuned to said working frequency of the transformer, said LC resonant circuit comprising a capacitor and a coil wound on a ferromagnetic core.

16. The system of claim 15, wherein the coil comprises a double winding of Litz wire on the ferromagnetic core.

17. The system of claim 16, wherein said generating circuit comprises:

a microprocessor configured to receive a synchronization signal when the key is inserted in said receptacle or lock;

a signal generator producing a signal having a frequency equal to the working frequency of the primary winding;

a generator of a modulation frequency; and an amplitude modulator; said modulator amplitude modulating said signal at said working frequency of the transformer at said modulation frequency.

18. The system of claim 17, further comprising an amplifier coupled to the output of said modulator and a tuned stage arranged to couple the modulated and amplified signal to said directional emitter.

19. The system of claim 17, further comprising means for enabling the system by a user's command.

* * * * *